(12) United States Patent
Ahvenainen et al.

(10) Patent No.: US 7,827,370 B2
(45) Date of Patent: Nov. 2, 2010

(54) PARTIAL PERMANENT WRITE PROTECTION OF A MEMORY CARD AND PARTIALLY PERMANENTLY WRITE PROTECTED MEMORY CARD

(75) Inventors: Marko T Ahvenainen, Ruutana (FI); Jani Hyvönen, Tampere (FI); Kimmo Mylly, Julkujärvi (FI)

(73) Assignee: Nokia Corporation, Espoo (FI)

( * ) Notice: Subject to any disclaimer, the term of this patent is extended or adjusted under 35 U.S.C. 154(b) by 937 days.

(21) Appl. No.: 11/176,669

(22) Filed: Jul. 8, 2005

(65) Prior Publication Data

US 2006/0018154 A1    Jan. 26, 2006

(30) Foreign Application Priority Data

Jul. 8, 2004    (EP)    .................... 04396046

(51) Int. Cl.
G06F 13/00    (2006.01)
G06F 13/28    (2006.01)
G06F 12/08    (2006.01)

(52) U.S. Cl. .................. 711/163; 711/115; 711/103; 711/E12.091; 711/E12.099

(58) Field of Classification Search .................. None
See application file for complete search history.

(56) References Cited

U.S. PATENT DOCUMENTS 5,345,413 A    9/1994    Alexander et al.
5,363,334 A    11/1994    Hewitt et al.
6,279,114 B1    8/2001    Holtzman et al.
2001/0016887 A1*    8/2001    Toombs et al. .............. 710/102

OTHER PUBLICATIONS

Catalyst Semiconductor, Inc.," CAT34RC02 2-kb I2C Serial EEPROM, Serial Presence Detect", Sep. 22, 2003, p. 6. http://www.catsemi.com/datasheets/discontinued/34RC02.pdf.*
Catalyst Semiconductor, Inc.,"CAT34RC02 2-kb I2C Serial EEPROM, Serial Presence Detect", Revision: I, Jun. 7, 2004, p. 6.*
MultimediaCard System Summary Version 3.31, MMCA Technicial Committee, Cupertino, CA, USA, XP002309087, Mar. 2003.

* cited by examiner

*Primary Examiner*—Reginald G Bragdon
*Assistant Examiner*—Eric S Cardwell
(74) *Attorney, Agent, or Firm*—Banner & Witcoff, Ltd

(57) ABSTRACT

This invention relates to a method permanently write protecting a portion of a memory card. According to the invention a bit indicating permanent write protection or permanent write protection of a portion of the memory card is set in the specific data register of the memory card to indicate that all the write protect groups protected with write protecting command are permanently write protected. In another embodiments of the invention special commands are used to control the write protection of the portion of the memory card. This invention also relates to a partially permanently write protected memory card. The invention further relates to an electronic device, a software, a system and a module utilizing the method of the invention.

25 Claims, 3 Drawing Sheets

| 127:126 | 125:122 | 121:120 | 119:112 | ... | 7:1 | 0:0 |
|---|---|---|---|---|---|---|
| CSD_STRUCTURE | SPEC_VERS | | TAAC | ... | CRC | |

PARTIAL PERMANENT WRITE PROTECTION OF A MEMORY CARD AND PARTIALLY PERMANENTLY WRITE PROTECTED MEMORY CARD

CROSS-REFERENCE TO RELATED APPLICATIONS

Priority is hereby claimed to EPO 04396046.7, filed on Jul. 8, 2004.

FIELD OF INVENTION

The present invention relates to a method for permanently write protecting a portion of a memory card and partially permanently write protected memory card. This invention also relates to an electronic device, software (computer-readable medium), a system and a module utilizing the method of the invention.

BACKGROUND OF THE INVENTION

Different types of memory cards, such as Compact Flash, Secure Digital or multimedia cards (MMC), are used in various small electronic devices such as personal digital assistants (PDA) or mobile terminals to store data. This data can be for example a program that is run on the device or data stored by the user.

Sometimes it is necessary to store two different kinds of data to the same card. These situations are for example when application data (a game or the operating system of the device) and user data are stored on the same card or when some part of the data is data stored by the card vendor, for example support of telephone numbers of a network operator, in addition to the data stored by the user.

When there is provided space in the memory card, for example in the MMC, for the user storable data in addition for the application data, the user does not have to carry two separate cards for the application and his own data. Sometimes it is even impossible to use two separate cards without the device in use having two separate MMC slots.

It is desirable that the data stored initially (application data, support telephone numbers) are not accidentally or consciously deleted by the user. This write protected portion of the MMC should act as a ROM-portion to the user. However, according to the MMC specification a memory type multimedia card is either a Read Only Memory (ROM) card or a Read/Write (RW) card. This means that only whole card can be initially permanently write protected. When using RW cards the user can alter the initially added content at later stage.

The MMC specification offers one solution to this kind of problem. It is possible to write protect a portion of the MMC. First the segment size to be protected is defined in the units of WP_GRP_SIZE groups as specified in the CSD (Card Specific Data) register. The write protection of the addressed write-protect group is then done using the SET_WRITE_PROT command.

The drawback of this method is that it does not allow the portion of the MMC to be permanently write protected. The write protection can be cancelled using CLR_WRITE_PROTECT command to the addressed write-protect group. Permanent write protection can only be set to the entire card by setting a permanent write protection bit (PERM_WRITE_PROTECT) in the CSD.

SUMMARY OF THE INVENTION

According to an embodiment of the invention, it is now invented a definition to the MMC standard for permanently write protecting a portion of a multimedia card. With the method of the invention a portion of the memory card containing important information can be partially permanently write protected while other parts of the memory card are still available to the user. This partial permanent write protection is achieved by identifying a bit in a specific data register of the memory card, setting said bit to have a certain predefined value that causes write protection command to mean permanent write protection of part of the memory of the memory card and simultaneously an allowance of use of another part of the memory, writing a piece of information to said memory of said memory card, and executing a write protection command concerning that said part of said memory in which said piece of information was written.

According to another embodiment of the invention a permanently partially write protected memory card is disclosed. This permanently partially write protected memory card contains a memory core that uses at least two different memory technologies, which allow the user to use part of the memory card similarly as an ordinary memory card, while other parts are inaccessible.

Still other embodiments of the invention provide a device, software, a system and a module which use the method of the invention.

DETAILED DESCRIPTION OF THE INVENTION

Figure 1:
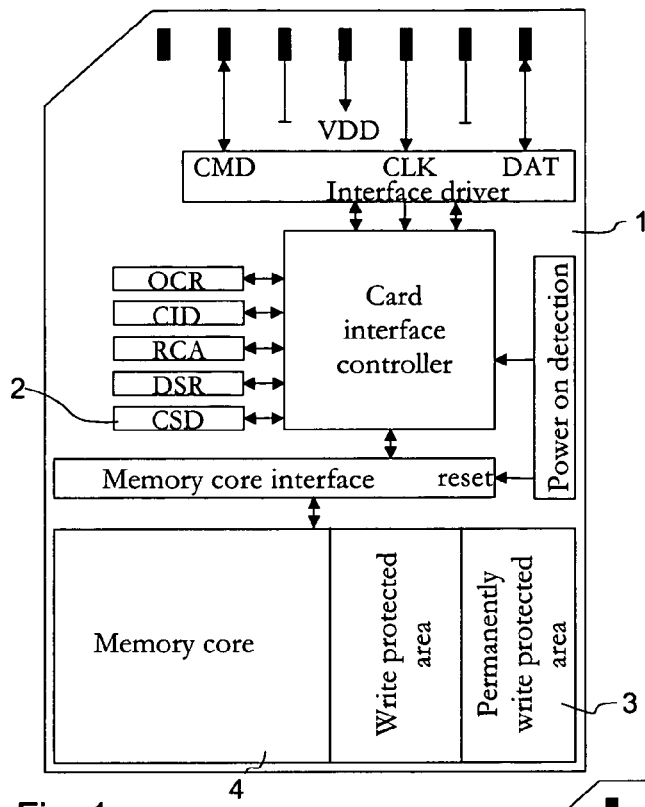
FIG. 1 presents the block diagram of a multimedia card according to the invention.
Figure 2:
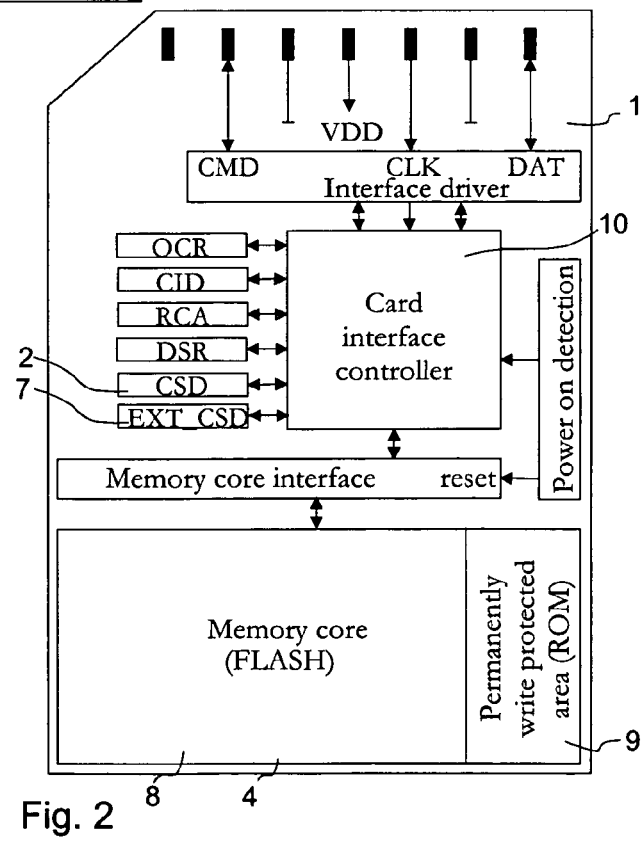
FIG. 2 presents the block diagram of a multimedia card according to another embodiment of the invention.
Figures 3, 5:
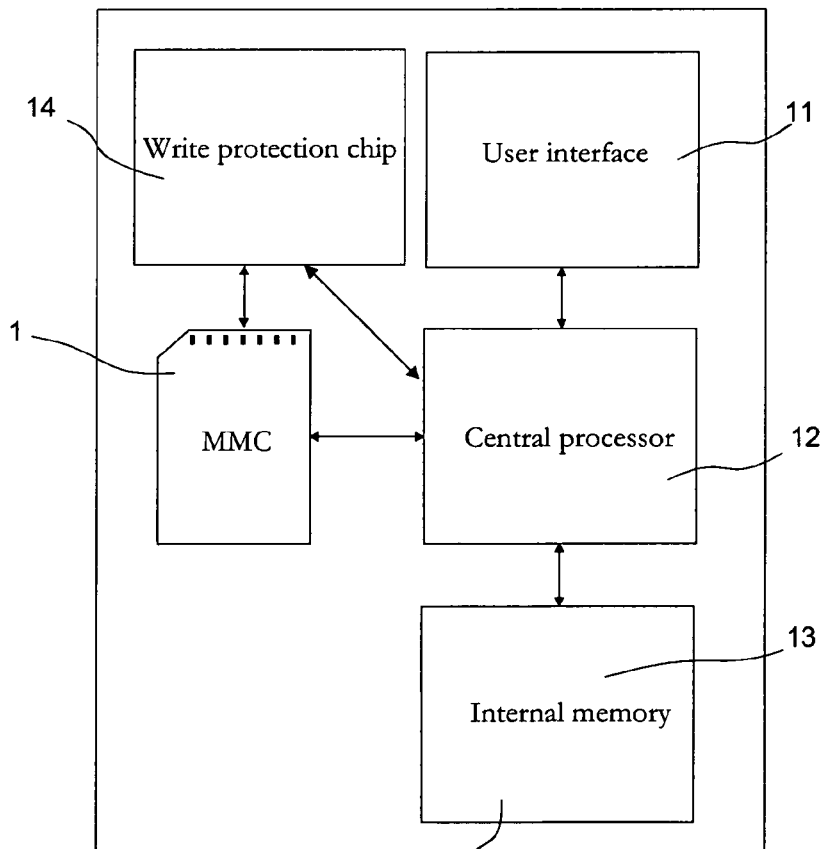
FIG. 3 presents the structure of the CSD register of the MMC according to the invention.
FIG. 5 presents the block diagram of a device using the MMC according to the invention.
Figure 4:
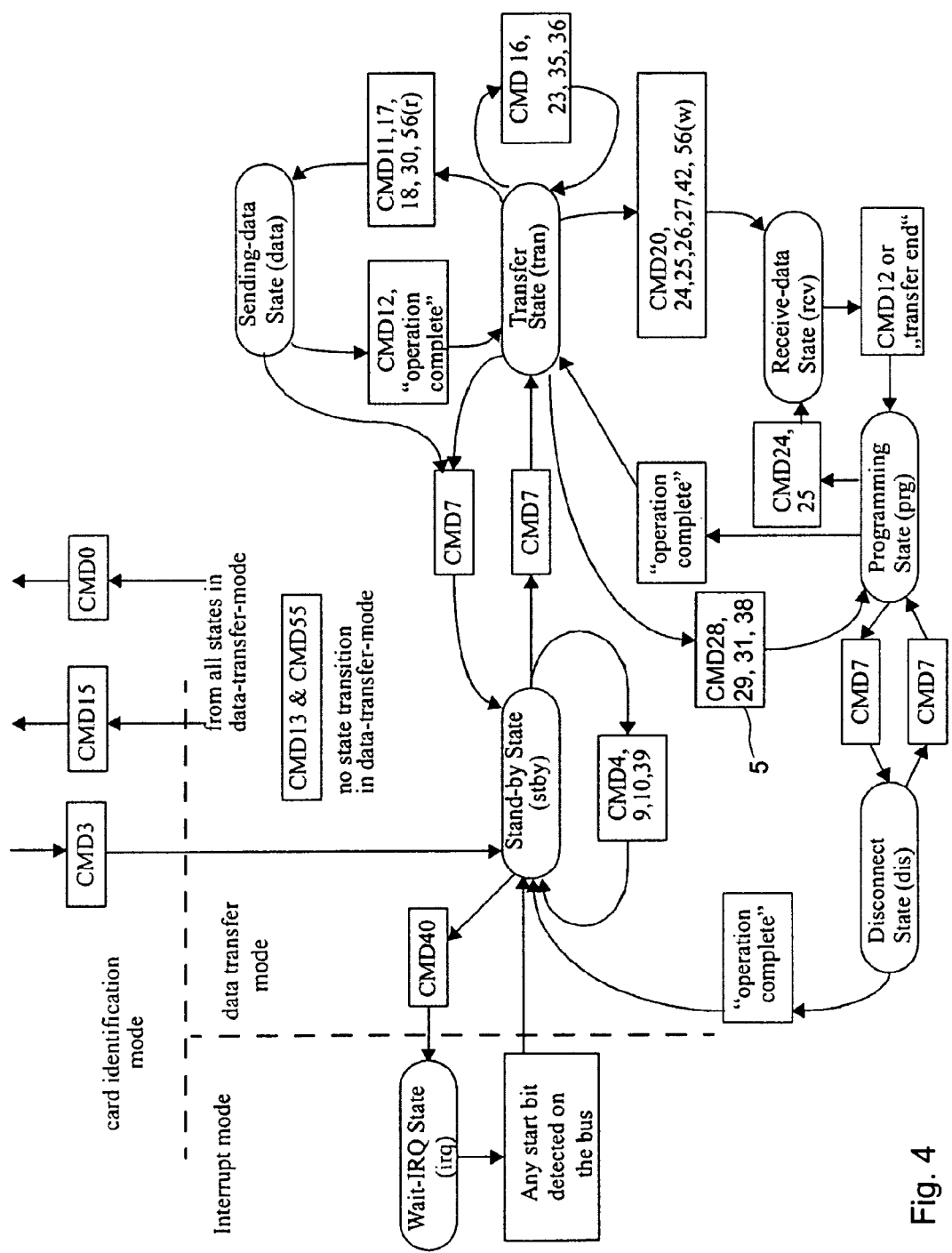
FIG. 4 presents the state diagram of the multimedia card according to the invention.

In FIG. 3 is presented the structure CSD 2 of the MMC 1. CSD provides information on how to access the card contents. The CSD 2 comprises different CSD fields which have different bit string lengths. For example CSD_STRUCTURE field is two bits long (bits 127:126), and SPEC_VERS field is four bits long (bits 125:122). All bit strings of the CSD are binary coded numbers.

First embodiment of the invention for partially write protecting a portion of a MMC 1 is to define the PERM_WRITE_PROTECT bit of the CSD 2 (bit 13), in such way that setting of this bit does not as such protect the whole card 1. Instead the bit 13 will indicate that all the write protect groups protected with SET_WRITE_PROT command 5 (CMD28) are permanently write protected and cannot be un-protected using CLR_WRITE_PROTECT command 5 (CMD29). The segment size to be protected is defined in the units of WP_GRP_SIZE groups as known to those skilled in the art. Part of the CSD 2 fields (Table 22 of the MMC specification) according to the first embodiment of invention is presented in Table 1.

TABLE 1

| permanent write protection of write protect groups | PERM_WRITE_PROTECT | 1 | R/W | [13:13] |
|---|---|---|---|---|

Second embodiment of the invention for partially write protecting a portion of a MMC 1 is to define one of the unused CSD 2 bits to indicate that a portion of the multimedia card 1 is permanently write protected. This bit can for example be the bit 17 of the CSD 2, and it can for example be called PARTIAL_PERM_WP. The write protection of the portion of MMC 1 works similarly as the write protection in the method described above. If the PARTIAL_PERM_WP bit is set in the CSD 2, the groups protected with SET_WRITE_PROTECT command 5 (CMD28) become permanently write protected, and can not be un-protected using CLEAR_WRITE_PROTECT command 5 (CMD29).

In order to maintain backwards compatibility, the PARTIAL_PERM_WP bit should be re-programmable. Additionally, in order to prevent accidental permanent protection, the PARTIAL_TERM_WP bit could be cleared automatically when SET_WRITE_PROTECT 5 command is received. This requires that the PARTIAL_PERM_WP bit is set individually each time a write protect group is write protected. Part of the CSD 2 (Table 22 of the MMC specification) fields according to the second embodiment of invention is presented in Table 2.

TABLE 2

| permanent write protection of write protect groups | PARTIAL_PERM_WP | 1 | R/W/E | [17:17] |
|---|---|---|---|---|

A possible amendment to the MMC specification according to the second embodiment of the invention could be as follows:
PARTIAL_PERM_WP
  Defines the functionality of the CMD28 (SET_WRITE_PROT). When set, the write protecting that is made will be permanent. When cleared (default), write protection is temporary and can be cleared using CMD29 (CLR_WRITE_PROT).

Third embodiment of the invention for partially write protecting a portion of a MMC 1 is to define a new command 5 (CMD31). This command would permanently protect individual write protection groups. The segments of the card that can be write protected are defined using WP_GRP_SIZE bits of CSD 2 as usual. SET_PERM_WRITE_PROT command then sets the write protection of the addressed write protection group.

MMC state diagram (data transfer mode) according to the third embodiment of the invention can be seen in FIG. 3. In this figure are presented the different possible commands and states of the MMC according to the embodiment. In order to set the MMC to Programming State, first CMD7 is sent in order to select one card and put it in the Transfer State (tran). After this CMD31 is sent and after successful operation the MMC returns back to Transfer State (tran). All data communication in data transfer mode is point-to point between the host and the selected card.

Amendments to the table 10 of the MMC specification are presented in Table 3, and an amendment to the table 15 of the MMC specification is presented in Table 4.

TABLE 3

| CMD31 | Ac | [31:0] data address | R1b | SET_PERM_WRITE_PROT | If the card has write protection features, this command sets the permanent write protection bit of the addressed group. The properties of the write protection are coded in the card specific data (WP_GRP_SIZE) |
|---|---|---|---|---|---|

TABLE 4

| CMD31 | — | — | — | — | prg | — | — | — | — | stby |
|---|---|---|---|---|---|---|---|---|---|---|

Fourth embodiment of the invention for partially write protecting a portion of a MMC 1 is to define an another new command 5 (CMD31). This SET_EDIT_PORT command defines a portion that is editable by the user in the memory 4 of the MMC 1. After this command is performed, the commands that edit (writes, removes or alters) the data can only be directed to this portion, and the write protected portion 3 is left intact.

A new type of memory card according to the invention could also be added to the MMC specification. This new type of MMC memory card has for example one permanently write protected area and one user editable area.

The partially write protected memory card 1 according to one embodiment of the invention contains primary technology memory portion 8 and at least one secondary technology memory portion 9. These memory technologies can for example be FLASH and ROM. The memory card 1 according to the invention also contains an additional data register 7 (Extended CSD, EXT_CSD), in which the existence and characteristics of the secondary technology memory portion 9 are described. The structure of this EXT_CSD 7 is similar to the structure of the CSD 2.

According to this embodiment of the invention only the primary technology memory portion is active after power up. All register data (for example CSD, access times and density) contained on the MMC applies to this primary technology portion 8. This ensures that the MMC is backwards compatible with the previous versions of the MMC specification. In order to access the secondary technology memory portion 9 the Extended CSD (EXT_CSD) register is read.

The partially write protected memory card 1 according to another embodiment of the invention also contains at least two technology memory portions 8 and 9. The existence and characteristics of the memory portions 8 and 9 are described in the EXT_CSD register 7. In this embodiment both technology memory portions are active after power up, and accessing of both memory portions 8 and 9 is done after reading the Extended CSD register 7.

According to third embodiment of the invention, the second technology memory portion 9 is Read Only Memory. This ROM portion appears as write protected area of the memory of the memory card 1. This size of this area is defined using write protect group size bit in the CSD 2. Also this embodiment is backwards compatible with the previous versions of the MMC specification.

When the memory of the memory card 1 is accessed, the host 6 reads the register data (CSD 2, EXT_CSD 7) in order to find out which types of memory technology is available. If the different technology memory portions 8, 9 are separated by locating them in a different physical addresses, the address space is defined in for example EXT_CSD 7 register. In this case the card interface controller 10 handles the accesses according to the address sent be the host 6.

If the different technology memory portions are separated by enabling them with a special command, for example with a enabling CE (Chip Enable) command. This command could be an existing command, or a new command added to the MMC specification. The CE numbers of the different technology memory portions 8, 9 are stored to the registers of MMC, where the host reads them when it is accessing the card.

The device 6 which uses the method of the invention can be for example a mobile terminal or a memory card reader/controller. This device 6 will conform physically and electronically with the standards of the memory card in use. This standard can for example be the MMC specification.

In FIG. 5 is described an example of this kind of device 6. The device 6 can comprise a user interface 11, central processor 12 and internal memory 13. These different blocks of the device 6 are connected to each other and to the MMC 1 via data bus. If a software is used to permanently write protect a portion of a memory card 1, the software can be stored in the internal memory 13 of the device 6, and executed in the central processor 12.

The memory card 1 and the device 6, which for example can be a mobile terminal, can be joined together in order to integrate them in to a one system. Also, it is possible to add a separate module 14 to the device 6 which takes care of the write protection of the memory card 1. This write protection chip 14 then takes care of all the needed steps when the memory card 1 is write protected, either via the central processor 12 or the directly with the memory card 1.

In these examples presented above a multimedia card (MMC) is used as an example of the memory card to be partially permanently write protected with the method of the invention. For the one skilled in art it is obvious that this does not limit the scope of the invention, and that the different alternatives of the invention are defined by the claims. For example the memory card to be write protected can also be some other type of memory card.

What is claimed is:

1. A method comprising:
   write protecting at least one part of a memory by a command;
   setting at least one bit in a data register configured to indicate that permanent write protection of the at least one part of the memory is allowed in order to redefine the command to allow permanent write protection, that cannot be un-protected by a command, of the at least one part of the memory; and
   executing the command in order to permanently write protect said at least one part of the memory.

2. A method according to the claim 1, wherein said at least one bit has a certain predefined value.

3. A method according to the claim 1, wherein said at least one bit is reprogrammable.

4. A method according to claim 1, wherein executing the command clears automatically said at least one bit.

5. A method according to claim 1, wherein said at least one part of the memory comprises at least one memory group having a certain memory size defined in the data register.

6. A method according to claim 5, wherein redefining the command allows permanent write protection of each memory group individually.

7. A method according to claim 1, wherein the memory is included on a multimedia card (MMC).

8. A method comprising:
   write protecting a first part of a memory by a first command;
   setting a second command to only allow access to a second part of the memory based on a bit in a data register configured to indicate that permanent write protection of the first part of the memory is allowed; and
   executing the second command in order to permanently write protect said first part of the memory.

9. A method according to claim 8, wherein executing the second command simultaneously allows access to the second part of the memory.

10. A method according to claim 8, wherein setting the second command defines a memory size of the second part of the memory.

11. A method according to claim 8, wherein executing the second command allows editing data of the second part of the memory.

12. An apparatus comprising:
    an interface controller arranged to write protect at least one part of a memory of said apparatus by a command;
    a data register arranged to define at least one bit to indicate that permanent write protection of the at least one part of the memory is allowed;
    a controller arranged to set the at least one bit in order to redefine the command to allow permanent write protection, that cannot be un-protected by a command, of the at least one part of the memory of said apparatus, and
    the controller arranged to execute the command in order to permanently write protect said at least one part of the memory.

13. An apparatus according to claim 12, wherein the memory is arranged to comprise at least one memory group.

14. An apparatus according to claim 13, wherein the data register is arranged to define a memory size of the at least one memory group.

15. An apparatus according to claim 14, wherein the controller is arranged to define the command to allow permanent write protection of the at least one memory group individually.

16. An apparatus according to claim 12, wherein an additional data register is arranged to control existence and characteristics of the at least one part of the memory.

17. An apparatus according to claim 16, wherein the additional data register is arranged to define access to the at least one part of the memory.

18. An apparatus according to claim 12, wherein the memory is arranged to implement different memory technologies.

19. An apparatus according to claim 12, wherein the apparatus is a multimedia card (MMC).

20. An apparatus comprising:
    an interface controller arranged to write protect a first part of a memory of said apparatus by a first command;

a data register arranged to define at least one bit to indicate that permanent write protection of the first part of the memory is allowed;

a controller arranged to set a second command to only allow access to a second part of the memory, and the controller arranged to execute the second command in order to permanently write protect the first part of the memory.

21. An apparatus according to claim 20, further comprising an interface arranged to allow editing data of the second part of the memory.

22. An apparatus comprising:

a user interface;

a central processor;

an internal memory;

an interface controller arranged to write protect at least one part of the internal memory by a command;

a data register arranged to define at least one bit to indicate that permanent write protection of the at least one part of the internal memory is allowed;

a controller arranged to set the at least one bit in order to redefine the command to allow permanent write protection, that cannot be un-protected by a command, of the at least one part of the internal memory, and the controller arranged to execute the command in order to permanently write protect said at least one part of the internal memory.

23. An apparatus according to claim 22, wherein the apparatus further comprises a module for write protection of the internal memory.

24. An apparatus according to claim 22, wherein the apparatus is one of the following: a mobile terminal and a memory card reader/controller.

25. A memory device having stored thereon instructions that, when executed, perform:

write protecting at least one part of a memory by a command;

setting at least one bit in a data register configured to indicate that permanent write protection of the at least one part of the memory is allowed in order to redefine the command to allow permanent write protection, that cannot be un-protected by a command, of the at least one part of the memory; and executing the command in order to permanently write protect said at least one part of the memory.

* * * * *